(12) United States Patent
Winn et al.

(10) Patent No.: US 8,849,730 B2
(45) Date of Patent: Sep. 30, 2014

(54) PREDICTION OF USER RESPONSE ACTIONS TO RECEIVED DATA

(75) Inventors: John Winn, Cambridge (GB); Fernando Garcia, Bothell, WA (US); Tore Sundelin, Duvall, WA (US); James Edelen, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 13/326,877

(22) Filed: Dec. 15, 2011

(65) Prior Publication Data

US 2013/0159220 A1 Jun. 20, 2013

(51) Int. Cl.
*G06N 3/08* (2006.01)
*G06F 19/24* (2011.01)

(52) U.S. Cl.
USPC .................................. 706/12; 706/20; 706/21

(58) Field of Classification Search
USPC ........................................................... 706/12
See application file for complete search history.

(56) References Cited

U.S. PATENT DOCUMENTS 7,136,710 B1   11/2006 Hoffberg et al.
7,636,701 B2 * 12/2009 Funge et al. .................... 706/47

OTHER PUBLICATIONS

Dabbish, et al., "Understanding Email Use: Predicting Action on a Message", Retrieved at <<http://sfussell.hci.cornell.edu/pubs/Manuscripts/Dabbish_CHI2005.pdf>>, Proceedings of the SIGCHI conference on Human factors in computing systems (CHI), Apr. 2-7, 2005, pp. 691-700.

Davison, et al., "Predicting Sequences of User Actions", Retrieved at <<http://www.cse.lehigh.edu/~brian/pubs/1998/aaaiws/aaai98ws.pdf>>, AAAI/ICML Workshop on Predicting the Future: AI Approaches to Time-Series Analysis, 1998, pp. 5-12.

Dredze, et al., "Intelligent Email: Aiding Users with AI," Retrieved at <<http://www.cs.jhu.edu/~mdredze/publications/nectar_intelligent_email.pdf>>, Proceedings of the 23rd national conference on Artificial intelligence (AAAI), vol. 3, 2008, pp. 4.

Aery, et al., "eMailSift: Email Classification Based on Structure and Content", Retrieved at <<http://dblab.cs.nccu.edu.tw/presentation/eMailSift%20Email%20Classification%20Based%20on%20Structure%20and%20Content/22780018.pdf>>, Proceedings of the 5th IEEE International Conference on Data Mining (ICDM), Nov. 27-30, 2005, pp. 8.

(Continued)

*Primary Examiner* — Jeffrey A Gaffin
*Assistant Examiner* — Nathan Brown, Jr.
(74) *Attorney, Agent, or Firm* — Louise Bowman; Jim Ross; Micky Minhas (57) ABSTRACT

A system is provided for automatically predicting actions a user is likely to take in response to receiving data. The system may be configured to monitor and observe a user's interactions with incoming data and to identify patterns of actions the user may take in response to the incoming data. The system may enable a trainer component and a classifier component to determine the probability a user may take a particular action and to make predictions of likely user actions based on the observations of the user and the identified pattern of the user's actions. The system may also be configured to continuously observe the user's actions to fine-tune and adjust the identified patterns of user actions and to update the probabilities of likely user actions in order increase the accuracy of the predicted user action in response to incoming data.

19 Claims, 6 Drawing Sheets

(56) References Cited

OTHER PUBLICATIONS

Dredze, et al., "Reply Expectation Prediction for Email Management", Retrieved at <<http://www.seas.upenn.edu/~strctlrn/bib/PDF/ceas05.pdf>>, Proceedings of the 2nd Conference on Email and Anti-Spam, 2005, pp. 2

Dabbish, et al., "To reply or not to reply: Predicting action on an email message", Retrieved at <<2.cs.cmu.edu/afs/cs.cmu.edu/user/kraut/www/RKraut.site.files/articles/dabbish04_emailsurvey_withNames.pdf>>, ACM, 2004, pp. 10.

Waern, et al., "ConCall: An information service for researchers based on EdInfo", Retrieved at <<http://soda.swedish-ict.se/2239/2/SICS-T--98-04--SE.pdf>>, Oct. 1998, pp. 10.

* cited by examiner

PREDICTION OF USER RESPONSE ACTIONS TO RECEIVED DATA

BACKGROUND

In a cloud-based environment, users may receive vast amounts of data from a number of data sources such as content generators, databases, search engines, other users, and so on. For example, users may receive phone calls, email messages, calendar requests, text messages, and other types of data and alerts. Manually reading, responding, and organizing these vast amounts of data can be overwhelming, time-consuming, and inefficient for the individual users.

Some applications attempt to simplify user actions in response to the data by anticipating the actions the user may take upon receipt of the incoming data. Such applications may attempt to understand the behaviors of the user by classifying the user's behavior based on observed user response trends. However, many attempts have limitations as the observed trends are too simplistic, generic, broad, or vague to accurately predict how the user may respond to the incoming data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a system for automatically predicting actions a user is likely to take in response to receiving data. The system may be configured to monitor and observe a user's interactions with incoming data and to identify patterns of actions the user may take in response to the incoming data. The system may enable a trainer component and a classifier component to determine the probability a user may take a particular action and to make predictions of likely user actions based on the observations of the user and the identified pattern of the user's actions. The system may also be configured to continuously observe the user's actions to fine-tune and adjust the identified patterns of user actions and to update the probabilities of likely user actions in order increase the accuracy of the predicted user action in response to incoming data and/or changes in user behavioral patterns.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a system is provided for automatically predicting the actions a user is likely to take in response to receipt of incoming data. The system may include a feature extractor for gathering user data and extracting features to facilitate pattern recognition, one or more sensors for tracking user actions and reporting them to the system, and an actions processor for gathering the data from the sensors and digesting for the system to use. A classification model may be used to make predictions based on past observations and the data currently available. A training model may be used to synthesize the learnings from observing past data and the behaviors taken on it. Furthermore, an accuracy calculator may be used to measure the performance of the system and adjust the user experience accordingly.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for predicting user action in response to received incoming data. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
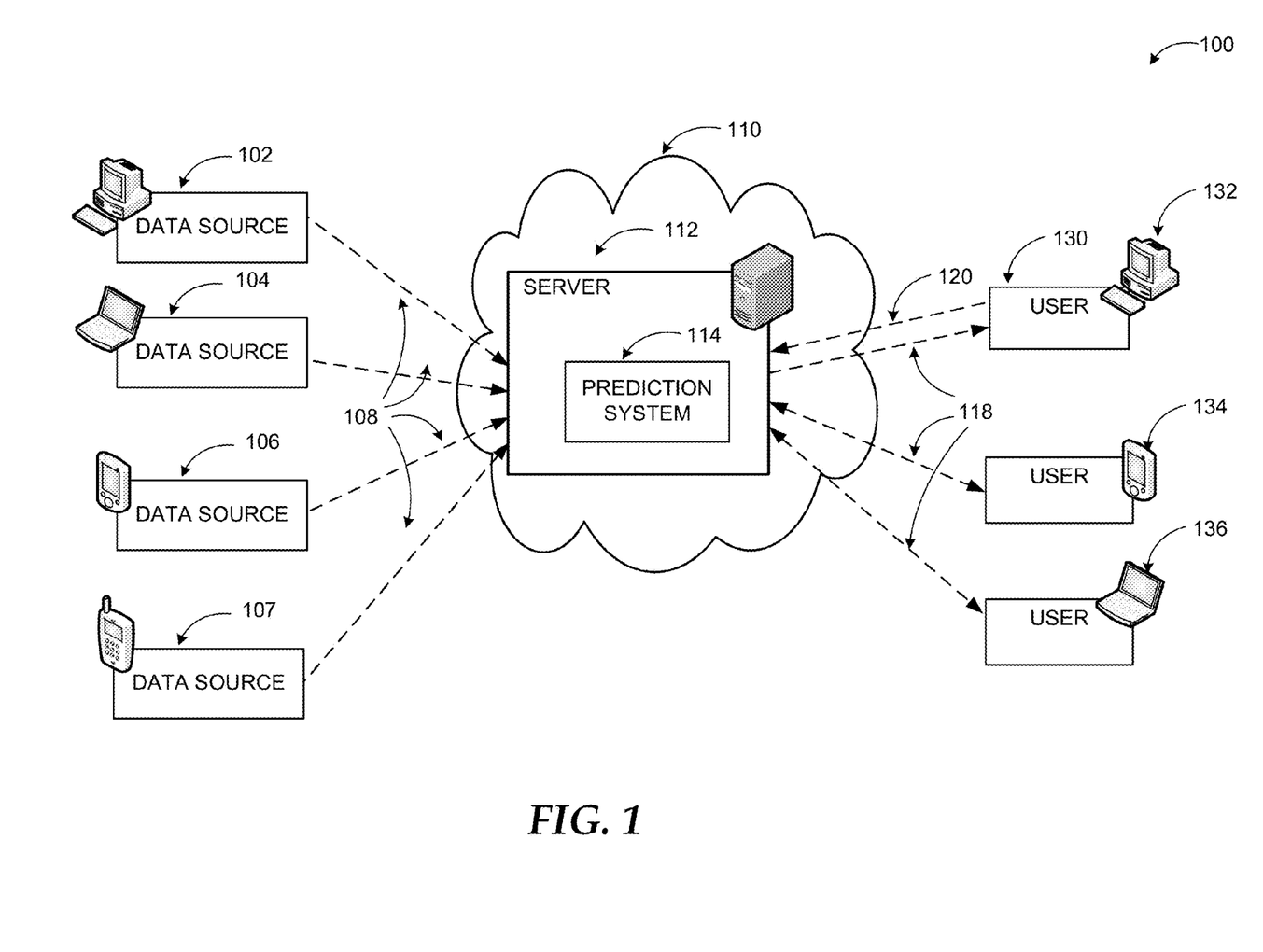
FIG. 1 illustrates an example cloud-based system for observing and predicting user actions, according to embodiments.

FIG. 1 illustrates an example cloud-based system for observing and predicting user actions, according to embodiments. As demonstrated in diagram 100, a server 112 within a cloud-based network 110 may include a prediction system 114 for observing user interactions with incoming data and predicting user actions in response to the incoming data. The server 112 within the cloud-based network 110 may facilitate receiving incoming data from a multitude of data sources 102, 104, 106 and delivering the data to one or more users 130.

In an example scenario in the cloud-based network 110, the user 130 may receive different types of data from multiple data sources 102, 104, 106 including email messages, text messages, instant messages, voicemail messages, phone calls, multimedia and/or audiovisual messages, documents, RSS feeds, social network updates, and other similar alerts and data. The user 130 may communicate with the server 112 over the cloud-based network 110 and may receive the incoming data over the cloud-based network 110 via a plurality of individual computing devices such as, for example, a laptop computer 136, a desktop computer 132, a smart phone 134, a car phone, a mobile phone, a tablet, and/or a home automation device.

In an example embodiment, upon receipt of incoming data over the cloud-based network 110 at the user's individual computing device, the user 130 may respond to the incoming data by executing a particular action. For example, in response to receipt of an email message, the user 130 may read and respond to the email, ignore, prioritize the email, delete the email, flag the email, move the email to a particular categorized folder, and/or save the email for later, as some example response actions. As another example, if the user 130 receives a calendar alert and/or an event request, the user may add the event to the user's personal calendar, and also may categorize the event as a work or personal event, and may mark the event as important. As yet another example, when the user receives a text message, some available response actions the user may take may include reading, responding, deleting, or saving the message for later. The above example response actions represent some available actions the user may take in response to incoming data, however, it is recognized that there are multiple other actions that may be available for a user to take in response to receipt of varying incoming data. In a further example, the user may read, edit, delete, or forward a received document depending on which computing device the document was received on or which application was used to receive the document. Thus, the context and the content of the document may impact how the user responds to it.

As mentioned above, the response actions the user 130 takes may depend on the context and subject of the incoming data, the location of the user 130, the device on which user 130 receives the data, and the time and date when the user 130 receives the incoming data. For example, the user 130 may respond to particular incoming data during business hours and other types of incoming data during evening or off hours. As an example of location based response actions, the user 130 may respond to work related data while the user 130 is located at work, and may save the same data for reviewing later if the user 130 is at home or on vacation. Further, if the user 130 is driving in the car, the user 130 may not read or respond to the incoming data while in the car, and upon arriving at a destination, the user 130 may read and execute a response action.

A system according to embodiments may enable analysis of the user's history of interactions with incoming data in order to predict the actions the user 130 is likely to take in response to receipt of current incoming data. The prediction system 114 may be configured to observe the user 130 as the user receives (118) the incoming data from one or more of the data sources 102, 104, 106 to identify what data the user 130 receives, and to identify what actions the user 130 takes upon receipt of the data. The prediction system 114 may continuously track the user over a period of time and identify a pattern of user behavior and response to received incoming data. Based on the tracked pattern of user response to the incoming data, the prediction system 114 may be able to determine a probability of the user 130 taking certain actions in response to certain incoming data. Based on the determined probabilities, the prediction system 114 may predict what action the user 130 may take upon receipt of particular data.

The prediction system 114 may be configured to predict a series of actions, when the actions are done, as well as context-based actions. For example, the prediction system 114 may recognize that in response to a particular incoming data, such as an email message, the user may read the message within an hour of receipt of the message and then reply to it. Additionally, the prediction system 114 may recognize the context and content of incoming data in order to predict user actions, such that upon receipt of an email message relating to the user's taxes or received from the user's accountant, the prediction system 114 may predict that the user 130 may save the email message to a "Tax Returns" folder stored on the user's personal computing device, for example. The prediction system 114 may also recognize that the user may print an attachment to an incoming message and/or may save an attachment to a designated folder on the user's computing device.

Based on the predicted actions, the prediction system 114 may be configured to suggest the predicted action to the user 130 and await user approval of the predicted action. In another embodiment, the prediction system 114 may automatically perform the predicted action on behalf of the user 130. For example, the system may automatically save an email attachment to a labeled folder or mark an incoming message as high priority for response. The prediction system 114 may further be configured to continuously observe the user actions in response to incoming data in order to continuously and dynamically update the determined probabilities and refine user action predictions in order to increase the accuracy of the predicted actions. Moreover, the prediction system 114 may be configured to monitor individual users, such that the prediction system 114 may make predictions of user action that are personalized to the specific observed user. The prediction system 114 may also be configured to monitor groups of users, such that a particular user's response action may be predicted based on group data observed and organized by the prediction system 114. For example, this may be done when a new user is enrolled in the system, to make useful predictions when no information about that specific user is available.

Figure 2:
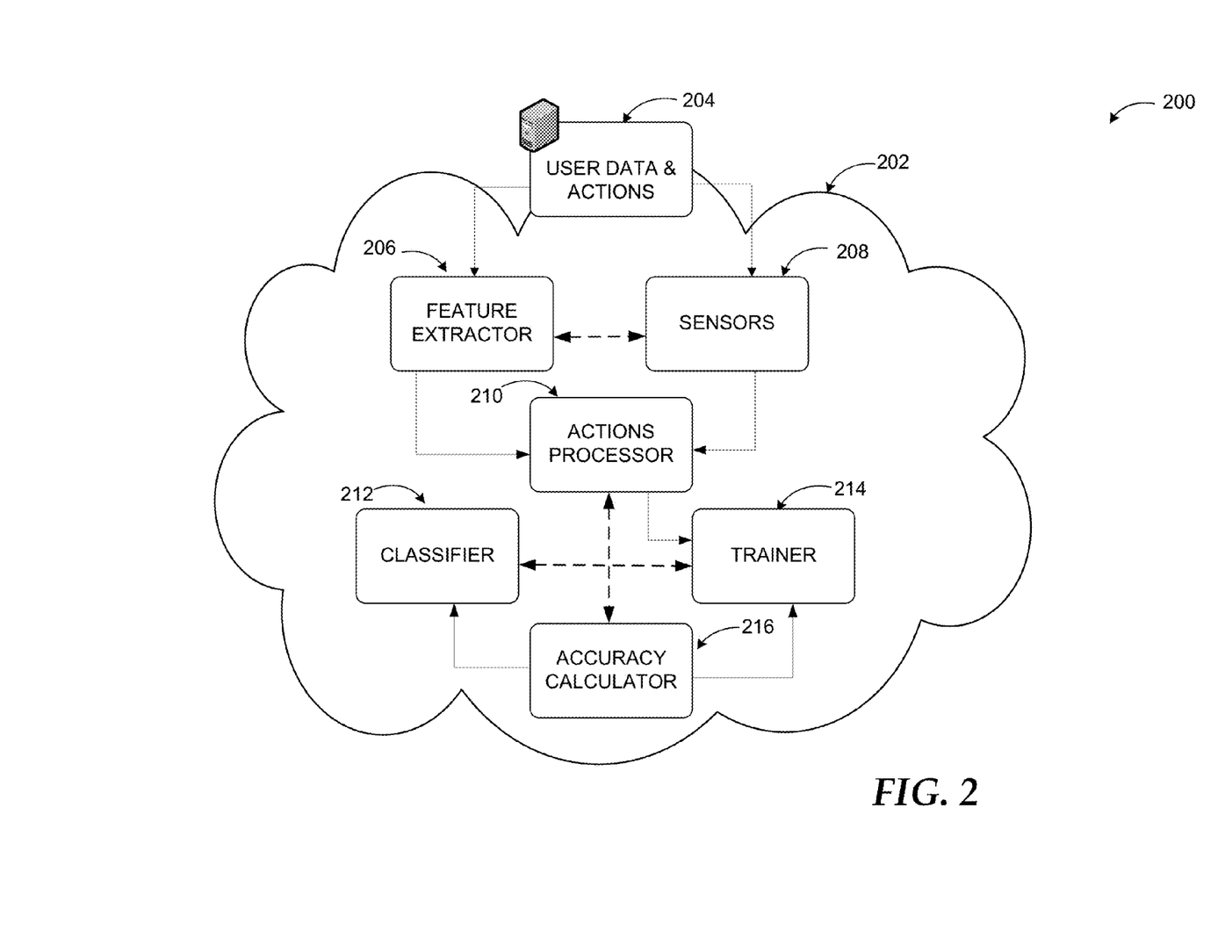
FIG. 2 illustrates a system for dynamically tracking user interactions with incoming data and predicting user response actions, according to embodiments.

FIG. 2 illustrates a system for dynamically tracking user interactions with incoming data and predicting user response actions, according to embodiments. As discussed above in conjunction with FIG. 1, a system according to embodiments may enable the analysis of a user's interactions with incoming data in order to predict the actions the user is likely to take upon receipt of and in response to the data. As demonstrated in diagram 200, a prediction system 202, which may be a cloud-based, private or public networked, or locally installed system, and may be configured to observe a user's data and actions 204 as the user receives incoming data from one or more the data sources, identify what data the user receives, and identify what response actions the user takes upon receipt of the data. Based upon the observations, the prediction system 202 may predict likely user actions in response to current incoming data.

According to some embodiments, the prediction system 202 may employ a plurality of components in order to track the user's interactions and to make predictions of the user's likely response actions upon receipt of incoming data. As the user initially receives incoming data, a feature extractor 206 may monitor the incoming data and process the data in order to extract information about the incoming data, as well as other contextual data relevant to the incoming data such as other messages previously received in the same conversation, from the same sender. For example, the incoming data may contain a variety of information or features, such as, subject of the data, recipient name and/or list, urgency, date and time information, location of the user when the data is received, language-based content such as certain keywords or topics, and number of times the user has replied to the received message, to name a few. The feature extractor 206 may also identify the type of incoming data and the source of the data. The feature extractor 206 may analyze the incoming data and extract the features from the incoming data in order to facilitate generating a pattern of actions the user takes in response to incoming data containing various features.

The prediction system 202 may also employ one or more sensor 208 components for tracking user actions. During the user's interaction with the system 202, the sensor 208 component may be configured to continuously track the user's actions in response to incoming data. The sensor 208 may report the detected actions by the user to the prediction system 202, and the prediction system may upload and store the detected actions in order to facilitate identifying a pattern of user actions. The prediction system 202 may combine and store the data gathered from the feature extractor 206 and the sensor 208 for identifying a pattern of actions the user takes in response to the incoming data containing particular features.

In an example embodiment, the prediction system 202 may employ an actions processor 210 for facilitating combining, storing and organizing the data gathered from the sensor 208 and the feature extractor 206 to determine a pattern of user actions in response to receiving data containing particular features. The actions processor 210 may gather the data collected by the sensor 208, and using the data collected by the sensor 208 in conjunction with the data collected by the feature extractor 206, the actions processor 210 may be configured to produce a user behavior database, which may include a list of actions the user has taken in response to incoming data containing particular features. For example, the database may contain all of the actions the user has taken during past observations when the data contained specific features, such as the content of the data, the time the data was sent, who sent the data, and the location of the user when receiving the data. The database may categorize the data by individual features, and also by user actions taken in response, such that the database may contain a detailed and complete record of the user's past actions in response to each identified feature of the incoming data.

In a further embodiment, the actions processor 210 may provide the complete database of past user actions to a trainer 214 component which may analyze the findings of the actions processor 210 to determine a pattern of actions the user takes when the incoming data includes particular features. The trainer 214 may access the database from the actions processor 210 in order to synthesize the observed data, and to learn from the past user action in order to enable the prediction system 202 to make predictions about user response actions in the future. During a training period, which may be specified by the prediction system 202, the trainer 214 may be configured to continuously gather the data and information collected and organized by the actions processor 210, and to analyze the data in order to identify the patterns and trends in the features of the data and the actions taken by the user. Based on the analysis of the data, the trainer 214 may generate conclusions, or learnings, which may indicate a probability of when certain user actions may be more or less likely to occur Additionally, the trainer 214 may be configured to continuously train the prediction system, such that it may dynamically adjust the identified patterns of user behavior and increase its user action prediction accuracy. While incoming data is received by the user, the trainer may continuously gather the data and information collected and organized by the actions processor 210 to fine-tune the identified pattern of user response action. The trainer 214 may take into account the identified features of the incoming data and the user action executed in response to the data, in order to update the database in the actions processor 210. The trainer may produce a new set of data regarding user action in response to data with certain features, and also may augment and adjust pre-existing data in the database of past user actions to fine tune the database's accuracy. The updated database in the actions processor 210 may be used to make more accurate predictions of user action in response to future incoming data including in response to changes to the user's behavioral patterns themselves (e.g., as can occur when a user changes jobs, management, or responsibilities).

In a further embodiment, the prediction system may employ a classifier 212 for making predictions about the user's actions in response to current incoming data based on the pattern of user response action identified by the trainer 214. The classifier 212 may be configured to continuously interact with the trainer 214 in order to predict the user's response to current incoming data based on the pattern of user response action determined by the trainer 214 from the database of past user actions taken in response to data having certain features. In an example scenario, when new incoming data is received by the user, the classifier 212 may identify the current incoming data and identify the features present in the current incoming data. The classifier 212 may use the learnings and the pattern of user actions identified by the trainer 214 to predict the user's response according to the identified pattern. For example, the pattern determined from the database by the trainer 214 may indicate that the user performs a particular action a certain percent of the time when the incoming data includes a specific feature, such as time the data was sent, who sent the data, or where the user was located when the user receives the data.

Using the generated pattern of past user actions, the classifier 212 may determine a probability that the user may take a particular action in response to incoming data having a particular set of features. Based on the determined probability, the classifier 212 may predict the user's response to the current incoming data and may automatically execute the predicted action. In another embodiment, the classifier 212 may suggest the predicted action to the user, and upon approval by the user, the predicted action may be executed. Additionally, the classifier 212 may utilize a statistical model, for example, to determine the probabilities and make accurate predictions for the user's actions in response to current incoming data. The classifier 212 may include a pre-generated knowledge of statistically significant values for pre-determined variables, such as the user identity or the type of data, and may apply the appropriate statistical model for generating user action predictions.

In a further embodiment, the trainer 214 may interact with an accuracy calculator 216 in order to measure the performance of the prediction system 202 and to determine if the classifier 212 is making accurate predictions of user behavior. The trainer 214 may additionally monitor the classifier's 212 predictions of user actions, in order to determine if the predicted action coincides with the actual user action taken. The accuracy calculator 216 may be configured to compare predicted action data from the classifier 212 to observed user action data in the actions processor 210 and measure the accuracy of the predicted action. The accuracy data produced by the accuracy calculator 216 may be used by the trainer 214 to fine tune the database produced by the action processor 210 in order to generate more accurate predictions on future user actions. It may also be used to determine whether to inform the user of the predictions in a user interface.

As discussed above, various types of data such as email messages, text messages, forum posts, voicemail, phone calls, location information (e.g., GPS coordinates), images, etc. may be utilized. In case of collection of private user data such as user's locations, consent may be obtained from each user prior to collection and/or use of such data. A pre-generated global knowledge of a statistically significant number of sample users, or a seed model, may be employed to make accurate predictions for new users of a system. The system may also analyze any relevant, pre-existing data about "new" users in order to "retrospectively" begin to train a prediction model and thus more rapidly get to a point of being able to make accurate predictions about new, incoming data for the users. Examples of scenarios in which a user may be "new" but can have pre-existing, relevant data are when a user with existing data is newly migrated to the system or when a system that does not contain the invention is "upgraded" to one that does while still retaining some/all of the extant user data. In some embodiments, a client-server architecture may be used, where the client can store and process data offline to make predictions. In other embodiments, large quantities of data may be handled in a distributed fashion and processed for multiple users concurrently. A system according to embodiments may iterate on its learning phases (online/offline training) Implementations may be independent from any user experience designed to take advantage of the system such that enough data is provided so that the user interface can be tailored to the experience desired. A system according to some embodiments may have knowledge of when to look for new data for a single or multiple actions to increase its knowledge of a user and may be able to process the same data multiple times without adversely affecting its learning.

Figure 3:
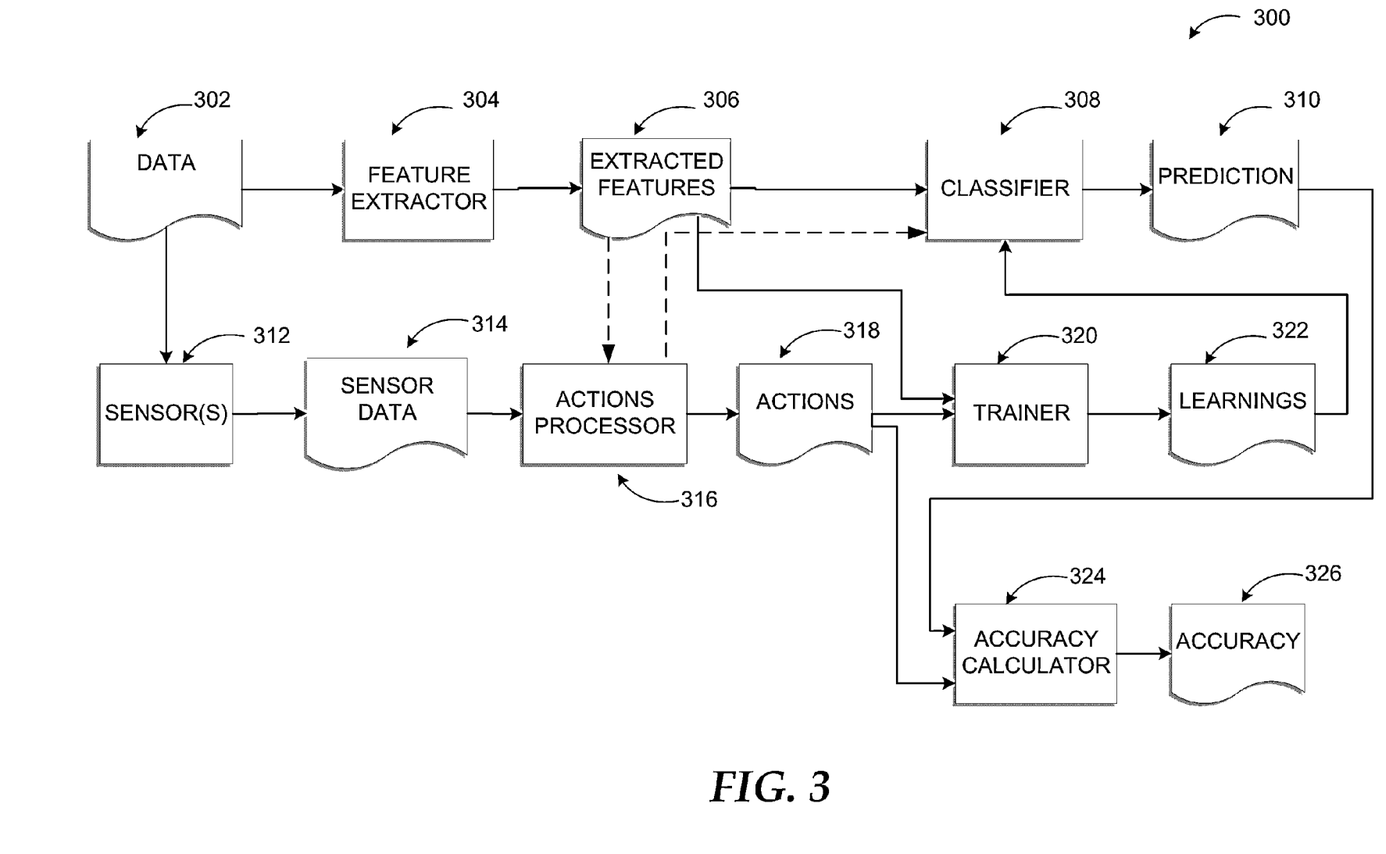
FIG. 3 illustrates an example functional block of dynamically tracking user interactions with incoming data and predicting user response actions, according to embodiments.

FIG. 3 illustrates an example functional block of dynamically tracking user interactions with incoming data and predicting user response actions, according to embodiments. The prediction system previously discussed in conjunction with FIG. 2 may employ a plurality of components in order to observer user actions in response to incoming data and to predict a user's response action in response to current and future incoming data. As demonstrated in diagram 300, the prediction system may initially facilitate transmitting incoming data 302 from a data source to a receiving user. When the user begins receiving the incoming data 302, a feature extractor 304 may be configured to identify and extract features of the incoming data. Some example extracted features 306 may include the context and/or subject of the data, type of data, sender information, recipient name and/or list, urgency, date and time information, location of the user when the data is received, and number of times the user has replied to the received message.

Additionally, when the user begins receiving the incoming data 302, one or more sensors 312 may be configured to monitor the user's response actions to the incoming data 302. The sensor information 314 including the user's response actions gathered by the sensor 312 may be provided to an actions processor 316 which may produce a list of past response actions 318 taken on the incoming data 302 by the user. The list produced by the actions processor 316 may include all of the actions the user has taken during past observations when the data contained specific extracted features 306. During a training period, which may be a period of time or a set quantity of data points, determined by the prediction system, the actions processor 316 may provide the list of all response actions 318 taken by the user to a trainer 320 component. The trainer component may analyze the list of past user response actions 318 and extracted features 306 identified from observation of the user during the training period in order to identify a pattern of user action in response to incoming data having particular features.

In an example embodiment, the prediction system may determine that the trainer 320 has collected enough data to enable the system to predict future use action in response to incoming data. The trainer 320 may provide its learnings 322 including the identified pattern of user action in response to incoming data having particular features to a classifier 308. The classifier 308 may be configured to interact with the actions processor 316 in conjunction with the learnings 322 from the trainer 320 to analyze the list of past user actions taken in response to data having certain features and predict the user's response to current incoming data. The classifier 308 may identify current incoming data from a data source and extract the features present in the current incoming data. The classifier 212 may access the list of user actions taken in response to past incoming data containing certain features, and the classifier 308 may make a prediction 310 of the user's response based upon the current identified features and the learnings 322 from the trainer 320 regarding the pattern of past user actions.

Moreover, the prediction system may continuously monitor the performance and accuracy of the classifier's predictions through an accuracy calculator 324. The accuracy calculator 324 may compare the classifier's 308 predictions 310 with observations of past user action in response to incoming data having a particular set of features and measure the accuracy 326 of the prediction. The accuracy 326 determination may be used by the trainer 320 to adjust the list of user response actions order to generate more accurate predictions on future user actions. Further, the prediction system may determine an appropriate statistical model to use in order to make the predictions of user action based upon the context of the incoming data 302. For example, a pre-generated statistical model may be provided based on certain variables such as the context of the incoming data and the recipient user of the data in order to determine a statistically based probability and prediction of user action based on the list of observed past user actions.

The example systems in FIG. 1 through 3 have been described with specific configurations, applications, and interactions. Embodiments are not limited to systems according to these examples. A system for tracking and predicting user actions in response to receipt of incoming data may be implemented in configurations employing fewer or additional components and performing other tasks. Furthermore, specific protocols and/or interfaces may be implemented in a similar manner using the principles described herein.

Figure 4:
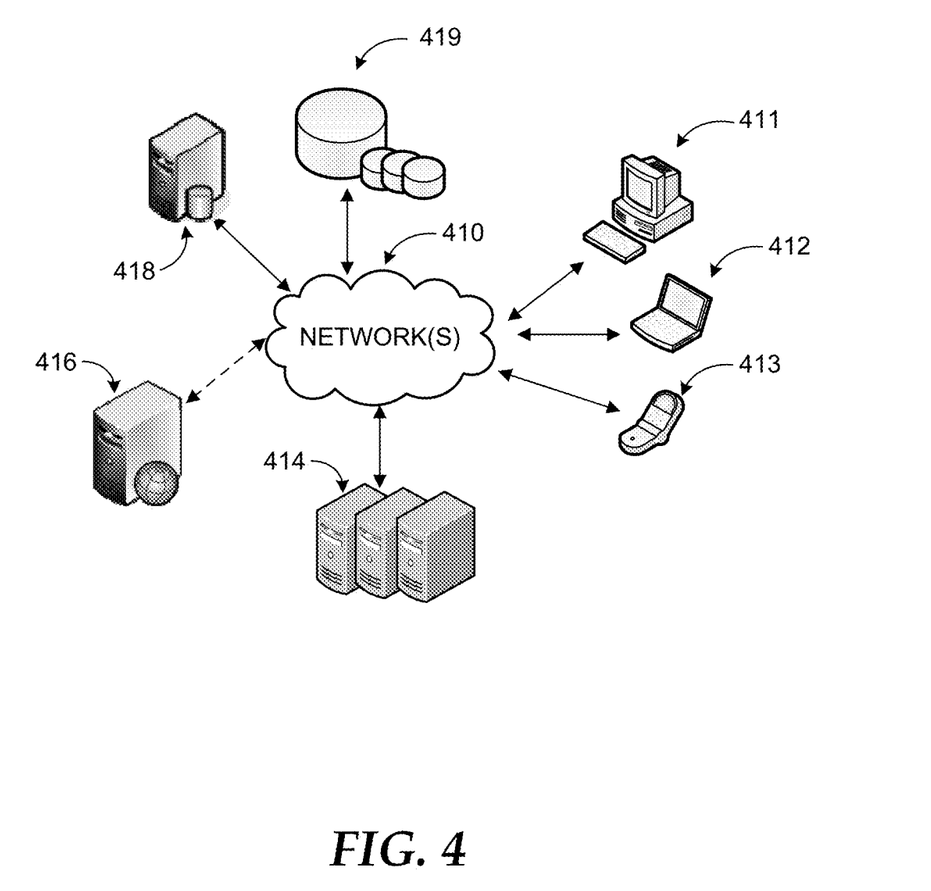
FIG. 4 is a networked environment, where a system according to embodiments may be implemented.

FIG. 4 is an example networked environment, where embodiments may be implemented. A system for tracking and predicting user actions in response to receipt of incoming data may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate automatically tracking and predicting user actions in response to receipt of incoming data. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for tracking and predicting user actions in response to receipt of incoming data. Furthermore, the networked environments discussed in FIG. 4 are for illustration purposes only. Embodiments are not limited to the example applications, modules, or processes.

Figure 5:
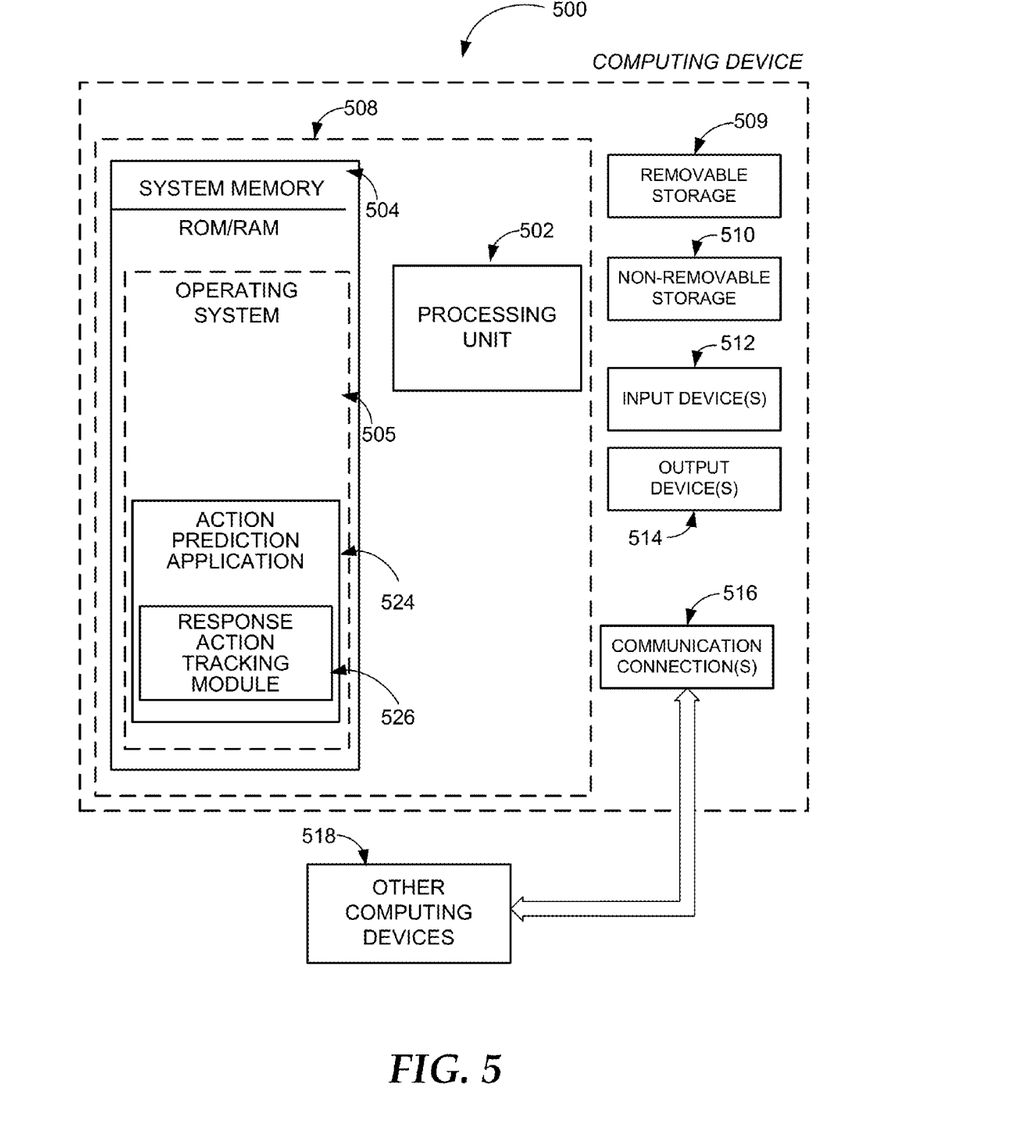
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for tracking and predicting user actions in response to receipt of incoming data according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as an action prediction application 524 and a response action tracking module 526.

The action prediction application 524 may facilitate automatically tracking and predicting user actions in response to receipt of incoming data. The action prediction application 524 may enable a computing device 500 to continually monitor incoming data transmitted over a cloud based environment and received by a user on the user's individual computing device. Through the response action tracking module 526, the action prediction application 524 may observe the user's actions in response to the incoming data, and may generate a pattern of user response actions to incoming data containing a particular set of features. Based upon the generated pattern of user response actions, the action prediction application may predict the user's likely response to a current set of incoming data, and may automatically execute the predicted action on the user's computing device. The action prediction application 524 and the response action tracking module 526 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
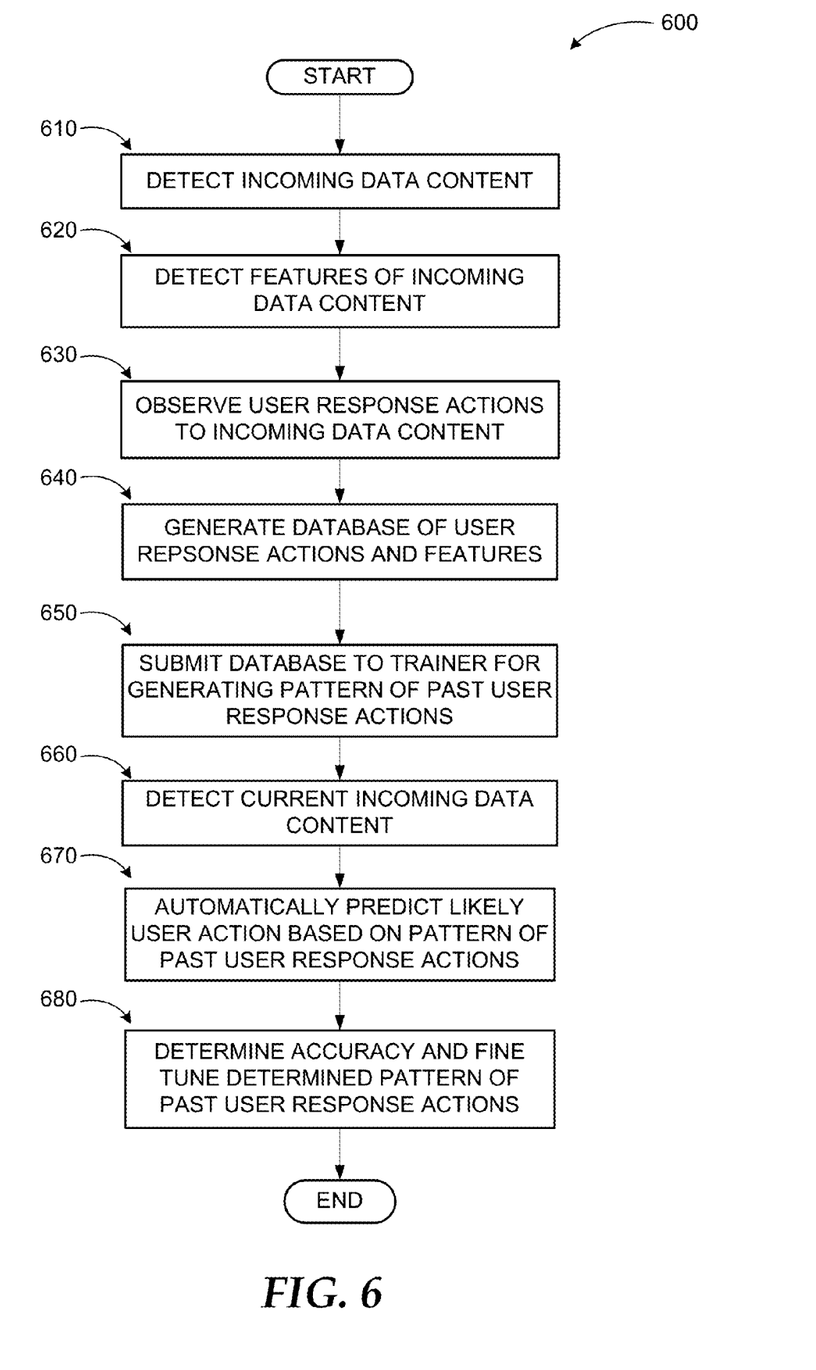
FIG. 6 illustrates a logic flow diagram for a process of tracking and predicting user actions in response to receipt of incoming data, according to embodiments.

FIG. 6 illustrates a logic flow diagram for a process of tracking and predicting user actions in response to receipt of incoming data, according to embodiments. Process 600 may be implemented on a computing device or similar electronic device capable of executing instructions through a processor.

Process 600 begins with operation 610, where the system may detect incoming data over a cloud-based environment. The incoming data may include email messages, text messages, instant messages, voicemail messages, phone calls, multimedia and/or audiovisual messages, documents, and other similar alerts and data. At operation 620 the system may detect the features of incoming data and extract the features in order to facilitate pattern recognition. The system may employ a feature extractor to identify and extract features of the incoming data. Features of the incoming data may include, for example, the subject of the data, recipient name and/or list, urgency, date and time information, location of the user when the data is received, and number of times the user has replied to the received message.

Operation 620 may be followed by operation 630 where the system may observe the user's response actions to the incoming data. The system may employ one or more sensors for monitoring the user's response actions and reporting the observed actions to the system. The sensor may provide the data to the prediction system, where at operation 640, the system may generate a database of user response actions and features. An actions processor may be configured to organize the extracted features data and the user response action data into a database, which may include a detailed list of the past user response actions taken in response to incoming data containing particular sets of features.

At operation 650, the actions processor may submit the database to a trainer component for generating a pattern of past user response actions. During a training period, the trainer may continuously gather the data from the database of the action processor and synthesize the data to determine an accurate pattern of response actions the user takes.

Operation 650 may be followed by operation 660, where the system may determine that enough data has been collected and synthesized during the designated training period to enable the system to accurately predict a user response action, and the system may detect new current incoming data. At operation 670, the system automatically predict likely user action based on the pattern of past user response actions. The system may employ a classifier to interact with the actions processor in conjunction with the determined pattern of user behavior from the trainer to predict the user's response to current incoming data based upon the current identified features and the learnings from the trainer regarding the pattern of past user actions.

At operation 680, the system may determine the accuracy of the prediction and fine tune the determined pattern of past user response actions. Through an accuracy calculator, the system may compare the classifier's predictions with observations of past user action in response to incoming data having a particular set of features and measure the accuracy of the prediction. The trainer may adjust the list of user response actions order to generate more accurate predictions on future user actions based on the accuracy determination.

The operations included in process 600 are for illustration purposes. Tracking and predicting user actions in response to receipt of incoming data may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for predicting user actions in response to receiving incoming data, the method comprising:

detecting incoming data from a data source for a user;

utilizing a sensor component to detect the user's actions in response to receiving the incoming data;

monitoring the user's actions in response to receiving the incoming data;

determining a pattern of user actions in response to the received incoming data;

uploading detected user action information from the sensor component;

detecting new incoming data from a data source using a classifier component;

predicting the user's action in response to receiving the new incoming data based on the pattern of user actions, an incoming data context and an incoming data content;

enabling an accuracy calculator component to measure an accuracy of predicted user actions; and adjusting the pattern of user actions to enable the classifier component to render more accurate predictions of user actions in response to the new incoming data.

2. The method of claim 1, further comprising:

extracting one or more features of the incoming data utilizing a feature extractor component.

3. The method of claim 2, wherein the one or more features of the incoming data includes one or more of: a subject of the incoming data, a classification of the incoming data, a computing device used to receive the incoming data, an application used to receive the incoming data, a source of the incoming data, past interactions of the user with the source, a time of when the incoming data is received, and a location of where the incoming data is received.

4. The method of claim 2, further comprising:

utilizing the sensor component to continuously detect the user's actions in response to receiving the incoming data.

5. The method of claim 4, further comprising:

uploading the detected user action information from the sensor component and an extracted feature information from the feature extractor component to an actions processor; and enabling the actions processor to combine, store, and organize the information from the sensor component and the feature extractor component into a user action database, wherein the user action database includes a list of past actions the user has taken in response to receiving the incoming data having one or more features.

6. The method of claim 5, further comprising:
providing the user action database to a trainer component; and
during a training period, enabling the trainer component to continuously synthesize the information organized in the user action database to determine the pattern of user actions in response to the received incoming data.

7. The method of claim 6, further comprising:
based on the pattern of user actions generated during the training period, generating learnings which indicate a probability of when user actions are likely to occur in response to the received incoming data.

8. The method of claim 7, further comprising:
enabling the classifier component to identify one or more features of the new incoming data;
based on the generated learnings from the trainer component, enabling the classifier component to predict the user's action in response to the new incoming data; and
automatically executing the predicted user action.

9. The method of claim 1, wherein the incoming data includes one or more of: an email message, a text message, an instant message, a voicemail message, a phone call, a multimedia content, an audiovisual message, RSS feed content, a social network update, a gaming network update, a forum posting, and a document.

10. The method of claim 1, wherein the user action in response to receiving the incoming data includes one or more of: a read, a respond, an ignore, a prioritize, a delete, a flag, a move to a categorized folder, a save for later, an add to calendar, a download, a print, an edit, and a forward action.

11. A server for predicting user actions in response to receiving incoming data, comprising:
a memory storing instructions;
a processor coupled to the memory, the processor executing an action prediction application in conjunction with stored instructions, wherein the action prediction application is configured to:
detect the incoming data from a data source for a user;
extract one or more features of the incoming data utilizing a feature extractor component;
utilize a sensor component to detect the user's actions in response to receiving the incoming data;
monitor the user's actions in response to receiving the incoming data;
determine a pattern of user actions in response to the received incoming data;
upload detected user action information from the sensor component;
detect new incoming data from a data source using a classifier component;
predict the user's action in response to receiving the new incoming data based on the pattern of user actions, an incoming data context and an incoming data content;
enable an accuracy calculator component to measure an accuracy of predicted user actions; and
adjust the pattern of user actions to enable the classifier component to render more accurate predictions of user actions in response to the new incoming data.

12. The server of claim 11, wherein the action prediction application is further configured to:
enable the sensor component to continuously detect the user's actions in response to receiving the incoming data;
upload the detected user action information from the sensor component and an extracted feature information from the feature extractor component to an actions processor; and
enable the actions processor to combine, store, and organize the information from the sensor component and the feature extractor component into a user action database, wherein the user action database includes a list of past actions the user has taken in response to receiving data having one or more features.

13. The server of claim 11, wherein the action prediction application is further configured to monitor the user's actions in response to receiving the incoming data and to determine a pattern of user actions in response to the received incoming data during one of: an initial training period and repeated training periods following the initial training periods.

14. The server of claim 11, wherein the action prediction application is further configured to:
pre-generate a seed model based on a global knowledge of a statistically significant number of sample users;
utilize the seed model to make predictions for new users; and
utilize behaviors of other users for existing and new users.

15. The server of claim 11, wherein the server is part of one of: a cloud-based system and a client-server architecture where the client is enabled to store and process the incoming data offline to render predictions.

16. The server of claim 11, wherein the action prediction application is configured to predict the user action based on incoming data content and incoming data context comprising one or more of: a subject of the incoming data, a classification of the incoming data, a computing device used to receive the incoming data, an application used to receive the incoming data, a source of the incoming data, past interactions of the user with the source, a time of when the incoming data is received, and a location of where the incoming data is received.

17. The server of claim 16, wherein the incoming data is received at one or more of: a laptop computer, a desktop computer, a smart phone, a car phone, a mobile phone, a tablet computer, and a home automation device.

18. A method executed at least in part in a computing device implementing an application for rendering predictions of user actions in response to new incoming data, the method comprising:
detecting incoming data from a data source for a user;
extracting one or more features of the incoming data utilizing a feature extractor component;
enabling a sensor component to continuously detect the user's actions in response to receiving the incoming data;
uploading detected user action information from the sensor component and an extracted feature information from the feature extractor component to an actions processor;
enabling the actions processor to combine, store, and organize the information from the sensor component and the feature extractor component into a user action database, wherein the user action database includes a list of past actions the user has taken in response to receiving data having one or more features;
determining a pattern of user actions in response to the received incoming data;
detecting new incoming data from a data source using a classifier component;
predicting the user's action in response to receiving the new incoming data based on the pattern of user actions, an incoming data context and an incoming data content;
enabling an accuracy calculator component to measure an accuracy of predicted user actions; and adjusting the pattern of user actions to enable the classifier component to render more accurate predictions of user actions in response to the new incoming data.

19. The method of claim 18, further comprising:

iterating online training for determining the pattern of user actions and offline training for generating new knowledge; and searching for new data associated with one or more actions to increase a knowledge of the user.

* * * * *